United States Patent
Shaikh et al.

(10) Patent No.: US 8,943,141 B2
(45) Date of Patent: Jan. 27, 2015

(54) SOCIAL NETWORKING SYSTEM AND METHODS OF IMPLEMENTATION

(71) Applicant: Lutebox Ltd., London (GB)

(72) Inventors: Owais Shaikh, Karachi (PK); Syed Ali Ahmed, London (GB)

(73) Assignee: Lutebox Ltd., London (GB)

( * ) Notice: Subject to any disclaimer, the term of this patent is extended or adjusted under 35 U.S.C. 154(b) by 243 days.

(21) Appl. No.: 13/726,980

(22) Filed: Dec. 26, 2012

(65) Prior Publication Data

US 2013/0339452 A1 Dec. 19, 2013

Related U.S. Application Data

(60) Provisional application No. 61/661,002, filed on Jun. 18, 2012.

(51) Int. Cl.
| | | |
|---|---|---|
| *H04L 12/58* | (2006.01) | |
| *G06Q 50/00* | (2012.01) | |
| *G06Q 30/06* | (2012.01) | |
| *H04L 12/18* | (2006.01) | |

(52) U.S. Cl.
CPC .............. *H04L 51/32* (2013.01); *G06Q 50/01* (2013.01); *G06Q 30/0601* (2013.01); *H04L 12/1818* (2013.01)
USPC ........... 709/205; 709/204; 709/231; 715/723; 715/721; 715/719; 715/720; 370/328

(58) Field of Classification Search
CPC ...................................... H04L 51/32
USPC ........................ 709/205, 204, 231
See application file for complete search history.

(56) References Cited

U.S. PATENT DOCUMENTS

| | | |
|---|---|---|
| 2006/0221173 A1 | 10/2006 | Duncan |
| 2007/0157228 A1 | 7/2007 | Bayer et al. |
| 2008/0040442 A1 | 2/2008 | Fieldman |
| 2010/0325559 A1 | 12/2010 | Westerinen et al. |
| 2011/0252340 A1* | 10/2011 | Thomas ................. 715/756 |
| 2012/0042013 A1 | 2/2012 | Roman et al. |
| 2012/0124389 A1* | 5/2012 | Villani et al. .......... 713/189 |

FOREIGN PATENT DOCUMENTS

CN 101527816 9/2009

OTHER PUBLICATIONS

European Search Report cited in the related Application No. 13171431.3 dated Nov. 21, 2013, 4 pages.
Boyer D. et al., "Virtual Social Clubs: Meeting Places for the Internet Community", Multimedia Computing and System, 1999, 5 pages.
European Search Report cited in the related Application No. 13171432.1 dated Nov. 22, 2013, 4 pages.

* cited by examiner

*Primary Examiner* — Jude Jean Gilles
(74) *Attorney, Agent, or Firm* — Andrew M. Calderon; Roberts Mlotkowski Safran & Cole, P.C.

(57) ABSTRACT

A social networking system that allows video chatting in combination with other interactive social activities such as, for example, shopping, picture sharing and viewing streaming videos, amongst others, is disclosed. A method implemented in a computing infrastructure includes initiating a user session by generating a unique user ID and group ID for the user session. The method further includes streaming at least one of music and video to a plurality of users on separate computing devices within the user session. The method further includes providing video chatting amongst the plurality of users on the separate computing devices, within the session, at the same time as the streaming.

20 Claims, 13 Drawing Sheets

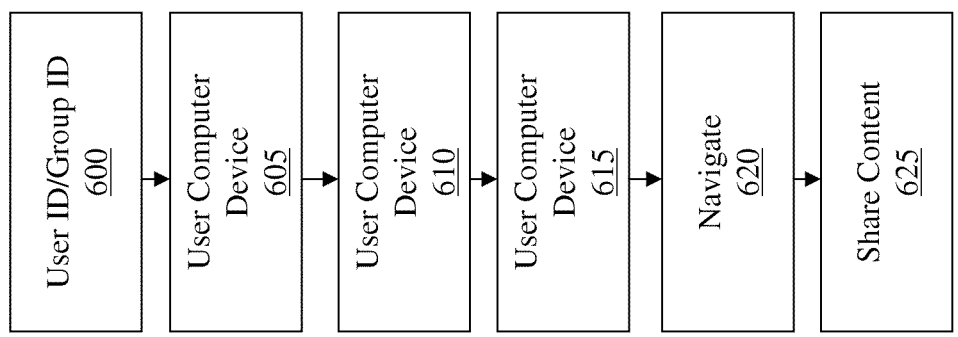

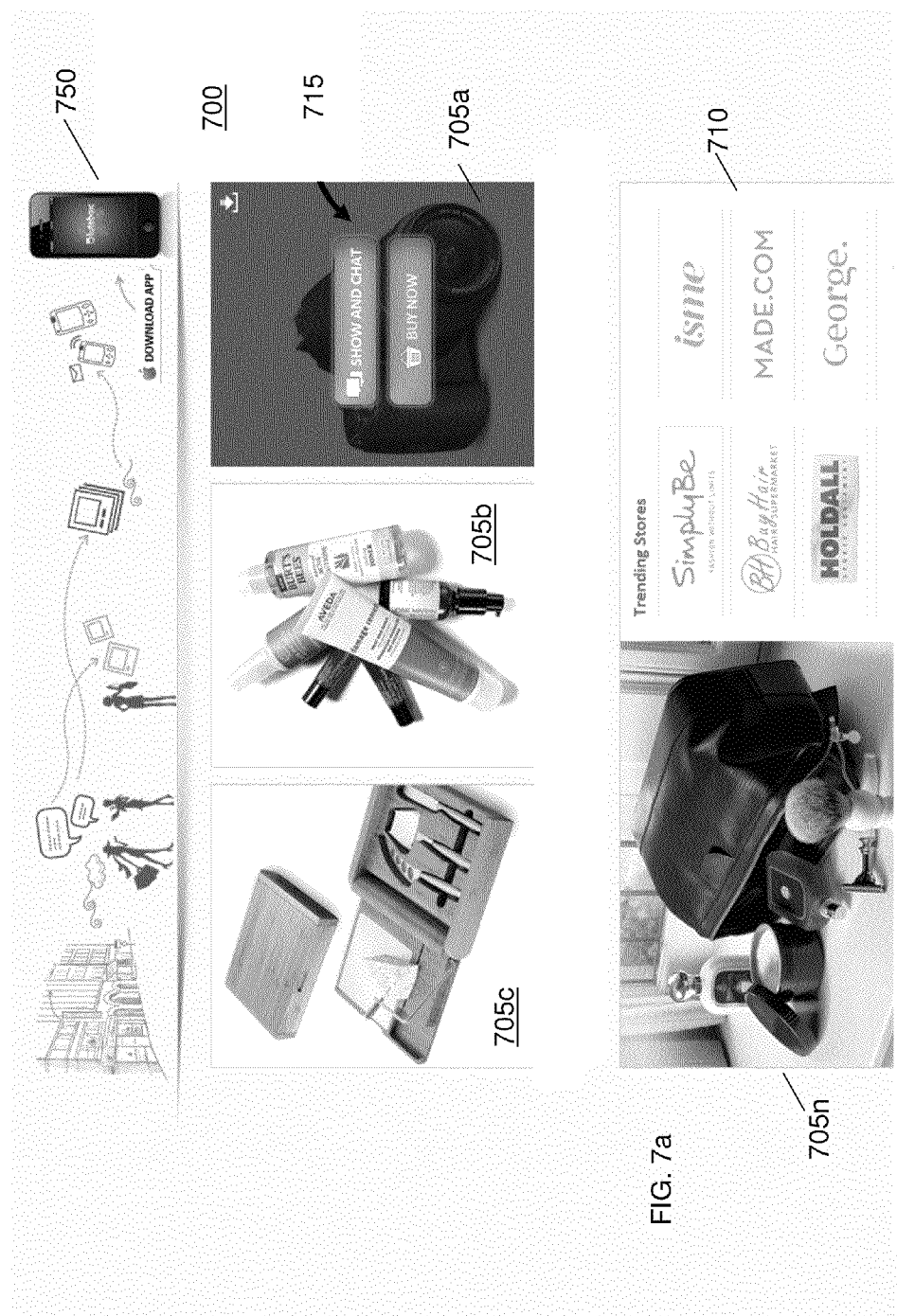

SOCIAL NETWORKING SYSTEM AND METHODS OF IMPLEMENTATION

CROSS REFERENCE TO RELATED APPLICATIONS

The present application claims priority to U.S. provisional application Ser. No. 61/661,002, filed on Jun. 18, 2012, the contents of which are incorporated by reference herein in its entirety.

FIELD OF THE INVENTION

The invention relates to social networking systems, applications and methods of implementation and, more particularly, to a social networking system that allows video chatting in combination with other interactive social activities such as, for example, shopping, picture sharing and viewing streaming videos, amongst others.

BACKGROUND OF THE INVENTION

People do not have a way to socialize in real-time around online activities like they do in real-life. Social interaction online around entertainment, shopping, and events is currently too cumbersome and inconvenient. Shopping online is boring and lonely, while shopping in the real-world is fun and social. Additionally social networking is not engaging, intimating nor responsive enough. Accordingly, there exists a need in the art to overcome the deficiencies and limitations described hereinabove.

BRIEF DESCRIPTION OF THE DRAWINGS

The present invention is described in the detailed description which follows, in reference to the noted plurality of drawings by way of non-limiting examples of exemplary embodiments of the present invention.

FIG. 6 shows a flow diagram for implementing processes according to aspects of the present invention;

FIGS. 7a-7c show an implementation using a third party website, in accordance with aspects of the present invention;

SUMMARY

Figure 1:
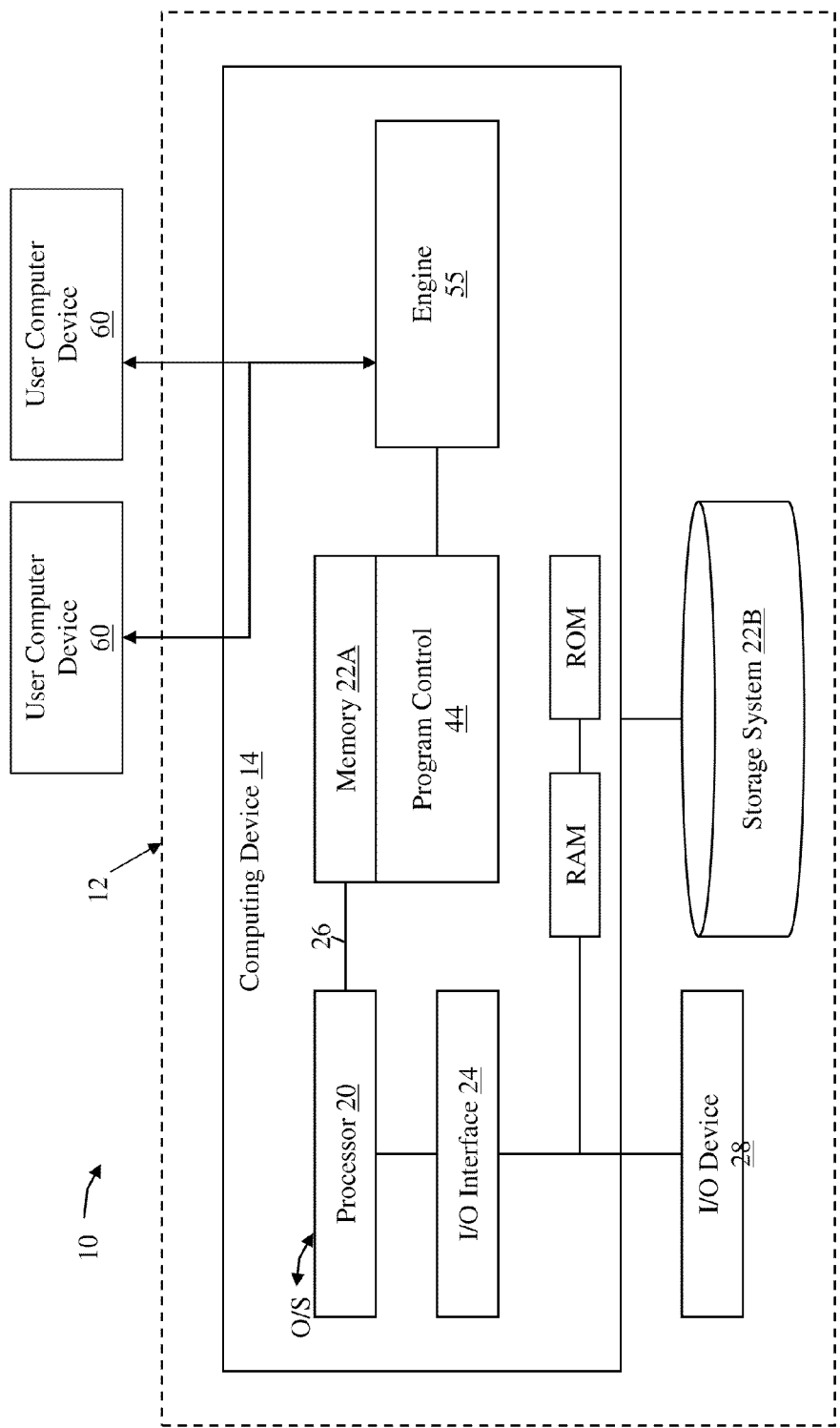
FIG. 1 shows an illustrative environment for managing the processes in accordance with the invention.

The following descriptions are provided herein in the summary, which find support throughout the disclosure. The following methods, computer program products, systems, etc. can be implemented in any of the flows and/or system diagrams or other figures as provided herein and discussed throughout the specification, as should be understood by those of skill in the art such that an adequate description to enable one of skill in the art to practice the invention is disclosed.

In one or more embodiments, a method implemented in a computing infrastructure comprises initiating a user session by generating a unique user ID and group ID for the user session. The method further comprises streaming at least one of music and video to a plurality of users on separate computing devices within the user session. The method further comprises providing video chatting amongst the plurality of users on the separate computing devices, within the session, at the same time as the streaming.

In embodiments, the video chatting is on a different channel than the streaming. An initiating user navigates amongst different streaming data without disrupting the video chatting, which is occurring simultaneously as the streaming of the data. The streaming is of a same quality amongst the separate computing devices. The streaming and the video chatting occur in real time. The streaming can be changed without disrupting the video chatting. The streaming originates from a same computing storage device. Ann initiating user is an only user with permission to navigate amongst different streaming content and invite any of the plurality of users into the user session.

In one or more embodiments, a system comprises at least one processing engine operable to: initiate a user session by generating a unique user ID and group ID for the user session; and stream video and/or music within the user session to a plurality of users while simultaneously providing video chatting amongst the plurality of users having access to the user session. The video chatting is provided on a different channel than the streaming video or music. The streaming video and/or music can be changed by a single user without disrupting the video chatting. The streaming video and/or music is stored in a central storage system on a computing network such that a same quality of the streaming video and/or music is streamed at the same time to all of the plurality of users invited to the user session.

In embodiments, the user session is initiated by the single user and comprises generating a user ID and a group ID that is for only the single user and invited users of the single user. The session is controlled only by the single user. The system further comprises providing a one click navigation from a single interface such that the single user can navigate amongst different content, which is shared amongst the amongst the plurality of users having access to the user session, while simultaneously video chatting, in real time. The single user controls the streaming by movement between different videos and/or music. The single user activates the video chatting by inviting one or more additional users to the session which, upon acceptance, automatically activates a webcam on the computing device of the one or more additional users. The streaming video or music is provided on a central repository and is provided to selected ones of the plurality of users having access to the user session.

In one or more embodiments, a computer program product comprises a computer usable storage medium having readable program code embodied in the storage medium. The computer program product includes at least one component operable to: initiate a user session; access streaming video or music via a single interactive interface within the user session; share the streamed stream video or music on separate computing devices of a plurality of users within the user session; and communicate amongst a plurality of users by video chatting in the user session as the streaming. The communicating is provided in a same session but on a different channel than the streaming such that a change in content will not disrupt the video chatting.

In embodiments, the communicating occurs in real time. A quality of the streamed stream video or music is provided at a same quality and at a same time to the separate computing devices during the user session. The streamed video or music is provided on a central repository accessible by any of a plurality of separate computing devices. A first user provides authorization for the central repository to provide the streamed stream video or music to selected users within the user session.

In one or more embodiments, a computer system for interactive social networking comprises a CPU, a computer readable memory and a computer readable storage media. First program instructions to initiate a user session by generating a unique user ID and group ID. Second program instructions to stream video or music, in real time and within the user session, to any of a plurality of separate computing devices by assigning the unique ID and group ID of the user session to the separate computing devices as requested by an initiating user of the user session. Third program instructions to provide video chatting in real time within the user session, and on a different channel than the streaming. The first, second, and third program instructions are stored on the computer readable storage media for execution by the CPU via the computer readable memory.

In embodiments, the streaming video or music is changeable only by the initiating user, and without disrupting the video chatting. Fourth program instructions to store on a storage system in a computing network the streaming video or music The streaming video or music is accessible within the user session by any of the plurality of users within the session, at a same quality.

DETAILED DESCRIPTION OF THE INVENTION

The invention relates to social networking systems, applications and methods of implementation and, more particularly, to a social networking system that allows video chatting in combination with other interactive social activities such as, for example, shopping, picture sharing and viewing streaming videos in real-time, amongst others activities. The present invention provides these activities in real time, such as real-time social shopping, product sharing, picture sharing, movie sharing and other social activities, in combination with video chat communication which can be displayed on plural computing devices at the same time. This allows for groups of people to not only interact with any combination of social activities, e.g., social shopping, but share this experience with others using a video chat communication, in real time with such activities, while viewing the same information on different devices. Advantageously, the present system and methods of the invention permit social activities in a social networking setting.

In implementations of the present invention, all the users sharing a piece of content will be served the exact same quality picture (or other content) at the same time, on a different computing device. This is in part achieved through the present invention and due to the fact that the content is already stored online in the "cloud", and thus the exact same quality content can be called to each user. Whereas with a virtual meeting software, for example, such implementations would create a digital copy of that content (due to the fact that it cannot guarantee the location of each content, i.e., could be on one user's desktop machine, or could be online, it does not know) and thus is much lower quality.

Also, advantageously, in implementations of the present invention it is possible to move between activities, e.g., shopping at different merchants, changing to a movie from shopping, selecting different items and placing them back on the virtual shelf, then selecting other items, etc., while not disrupting the video chat (video conferencing or video streaming) or other communication. This can be achieved by having the activities provided separately from the video or texting communication.

As an example use, a user would log into the system of the present invention. They would click on the shopping mall icon, for example. Once there, they can select a store. Inside a store they can pick a category they would like to view, such as men's shoes. Then they will get a stream of pictures of men's shoes from the retailer. They can then click on a button and the system and methods of the present invention will automatically open the social slider and activate videochat using a webcam. Then the user can click the "invite" button to invite a friend who is online to view that content with them while video chatting. Once the invitee accepts, their webcam will activate thus allowing both users to videochat, and they will be able to view the content together. In this way, it would be possible to view items together, discuss these items, make recommendations to one another prior to purchasing of the items, compare brands and prices at different stores, etc.

The present invention can link to merchants with virtual stores where users can browse for products while socializing with their friends. For example, for shopping, the purchase option is available to all users and they can choose to take bulk discounts on the basis of a mutual purchase, based on shared information.

System Environment

The present invention may be embodied as a system, method or computer program product. The present invention may take the form of a hardware embodiment, a software embodiment or an combination of software and hardware. Furthermore, the present invention may take the form of a computer program product embodied in any tangible storage medium of expression having computer-usable program code embodied in the medium. The tangible storage medium can be computer-usable storage or computer-readable medium that can contain, store and/or communicate the program for use by or in connection with the instruction execution system, apparatus, or device. The computer-usable storage or computer-readable medium may be, for example, an electronic, magnetic, optical, electromagnetic, infrared, or semiconductor system, apparatus, or device. Any combination of one or more computer readable medium(s) may be utilized.

More specifically, the computer-usable storage or computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

FIG. 1 shows an illustrative environment 10 for managing the processes in accordance with the invention. The environment 10 includes a server or other computing system 12 that can perform the processes described herein, and which can process the instructions on the computer-usable storage or computer-readable medium. The server 12 includes a computing device 14 which can be resident on a network infrastructure or computing device. As should be understood by those of skill in the art, the computing device 14 can comprise any general purpose computing article of manufacture capable of executing computer program code installed thereon (e.g., a personal computer, server, etc.). To this extent, in embodiments, the functionality provided by the computing device 14 can be implemented by a computing article of manufacture that includes any combination of general and/or specific purpose hardware and/or computer program code. Similarly, the computing infrastructure 12 is only illustrative of various types of computer infrastructures for implementing the invention. For example, in embodiments, the computing infrastructure 12 comprises two or more computing devices (e.g., a server cluster) that communicate over any type of communications link, such as a network, a shared memory, or the like, to perform the process described herein. The communications link can comprise any combination of wired and/or wireless links; any combination of one or more types of networks (e.g., the Internet, a wide area network, a local area network, a virtual private network, etc.); and/or utilize any combination of transmission techniques and protocols.

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be, for example, a handheld device, PDA, handset, keyboard, etc.

In general, the processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in the computing device 14.

Moreover, in accordance with aspects of the invention, the program control 44 controls an engine 55 that performs one or more of the processes described herein. The engine 55 may be implemented as separate dedicated processors or a single or several processors to provide the function of this tool. Moreover, it should be understood by those of ordinary skill in the art that the engine 55 is used as a general descriptive term for providing the features and/or functions of the present invention, and that the engine 55 may comprise many different components.

It should be understood by those of skill in the art that the functions discussed further herein are implemented by the engine 55 and/or computing device 14 and/or server 12, all of which are shown in FIG. 1. These functions can include, as example, sharing of data, video chatting in combination with other real-time interactive social activities, generation of revenue, controls, session creation and maintenance, etc., amongst other features. It should also be understood by those of ordinary skill in the art, that the content, e.g., videos, pictures, etc. shown and/or discussed herein used in implementing the present invention and shown on a user's interface (computing device) may be stored locally, on a user's computing device, or within a networking environment such as over through "cloud computing". Cloud computing allows a call up of same quality content to every computer. The content can be transferred locally, from a host computer, to the "cloud."

As should be understood by those of skill in the art, cloud computing is the use of computing resources (hardware and software) that are delivered as a service over a network (typically the Internet). Cloud computing entrusts remote services with a user's data, software and computation. The end users access cloud-based applications through a web browser or a light-weight desktop or mobile app while the business software and user's data are stored on servers at a remote location.

In embodiments, the engine 55 operates to allows video chatting in combination with other real-time interactive social activities such as, for example, shopping and product sharing, picture sharing, movie sharing and other social activities. This allows for groups of people to interact with any combination of interactive activities, and share this experience with others using a video chat communication, in real time and viewing the same content on different devices. For example, the engine 55 provides a social experience application that allows sharing of many different media such as, for example, photos and videos so that family and friends anywhere in the world can experience the emotion around content at the same time through their user computer device 60, e.g., smartphones, laptops, tablets, desktops or other computing devices. In embodiments, each session is controlled only by an initiating user of the session such that the initiating user is an only user with permission to navigate amongst any of a plurality of virtual stores, invite different users to the session, and control video chatting amongst the invited, different users.

In embodiments, the present invention can be provided on mobile applications. In this way, any of the computing devices, program controls, program computer instructions, computer program products can be implemented on a mobile device, implemented using mobile applications.

The computer devices 60 allow any number of users to view photos, watch videos and even shop together while group video-chatting or texting, for example. Accordingly, the present invention allows several users to share albums (a set of pictures or other multimedia) or shop with friends and families while having video conferences (e.g., also referred to as video chatting) with up to any number of users, e.g., six users. The video chat will be an element separate to the albums or other social activities provided by the present invention, which will allow all users to switch between albums, e.g., shopping experiences, pictures, etc., or other social activities, in real time, while being able to comment, text chat, video chat, in real time, while all are viewing the same albums, pictures or conducting other social activities, i.e., shopping, in unison. In embodiments, only the initiating user can be provided with the permission to navigate amongst different views, content, e.g., shopping, video, photos, etc., inviting of other users, and other controls In embodiments, the album can include shopping products which can be shared in real-time. Albums can also be set of pictures of any product, family member, friend, etc. In embodiments, each album drives picture IDs by which the entire information is called. This calling of name functionality increases logic layer algorithms but reduces database spacing. The video chat will be an element separate to the albums which will allow a user to switch between albums, e.g., pictures, shopping experiences, different merchants or products, seeing the content in real time with one another, while still being able to comment and text chat or video at the same time.

In embodiments, the control functionality for implementing the present invention is via sessions. The session creation is done at run time and the host is identified against a user's ID. The ID of the session is also host related and is randomly generated so individuals cannot just join for security purposes. In embodiments, only the initiating user (host) can be provided with the permission to navigate amongst different views, content, e.g., shopping, video, photos, etc., inviting of other users, and other controls. Also the method of writing to the item holder does not stand valid. In embodiments, multiple session files are called at different instances for a value of change, which then results in a change in the value. That is, there is a single file which is shared between multiple users, however, when another session is started based on the fields in the database all the values are manipulated for those users.

More specifically, the underlying functionality of the present invention, e.g., code, is provided in such a way that sessions are created and certain part of the code is retained in a shared space, accessing locations and timers. For example, each user connects into the same file with the ID assigned, which calls a resource file which is writeable by the host and viewable by the user. Hence all the changes on the file are automatically updated for the remaining users. In embodiments, the different points are retained in the shared space such as seek location, pause (binary), play (binary), volume level, mute (binary).

Timers are the seek points in a video and for refresh rates. The timing is subject to each video and also the timers are controlled by the host. The timers are not accessed but are set for refreshing in order to access the shared files. The timers can be altered based on the functionality as per the requirement. In order for optimization, the number of users can be restricted at a time for the videoconference, however, the number can be increased based on bandwidth availability.

For pictures (and videos and other multimedia), the instance is called on the basis of a time lapse which becomes negligible and the information is only read on the basis of change hence not preloading or unnecessary bandwidth consumption. That means as the images do not have a timeline and do not require to sync up during the viewing of a single picture (which can be any content) and only require change as and when the change is made by the host.

The present invention is capable of allowing users to watch the same quality photo. This can be done as the photo is loaded via the same source (i.e., the present invention knows the specific location of the content as it is stored in the "cloud", e.g., server 14 or computing device 14, (compared to conventional systems which rely on digitally deteriorated copies) hence the quality is not affected. As photos are still frames, the picture will load and the image loaded will have the same quality.

Figure 2:
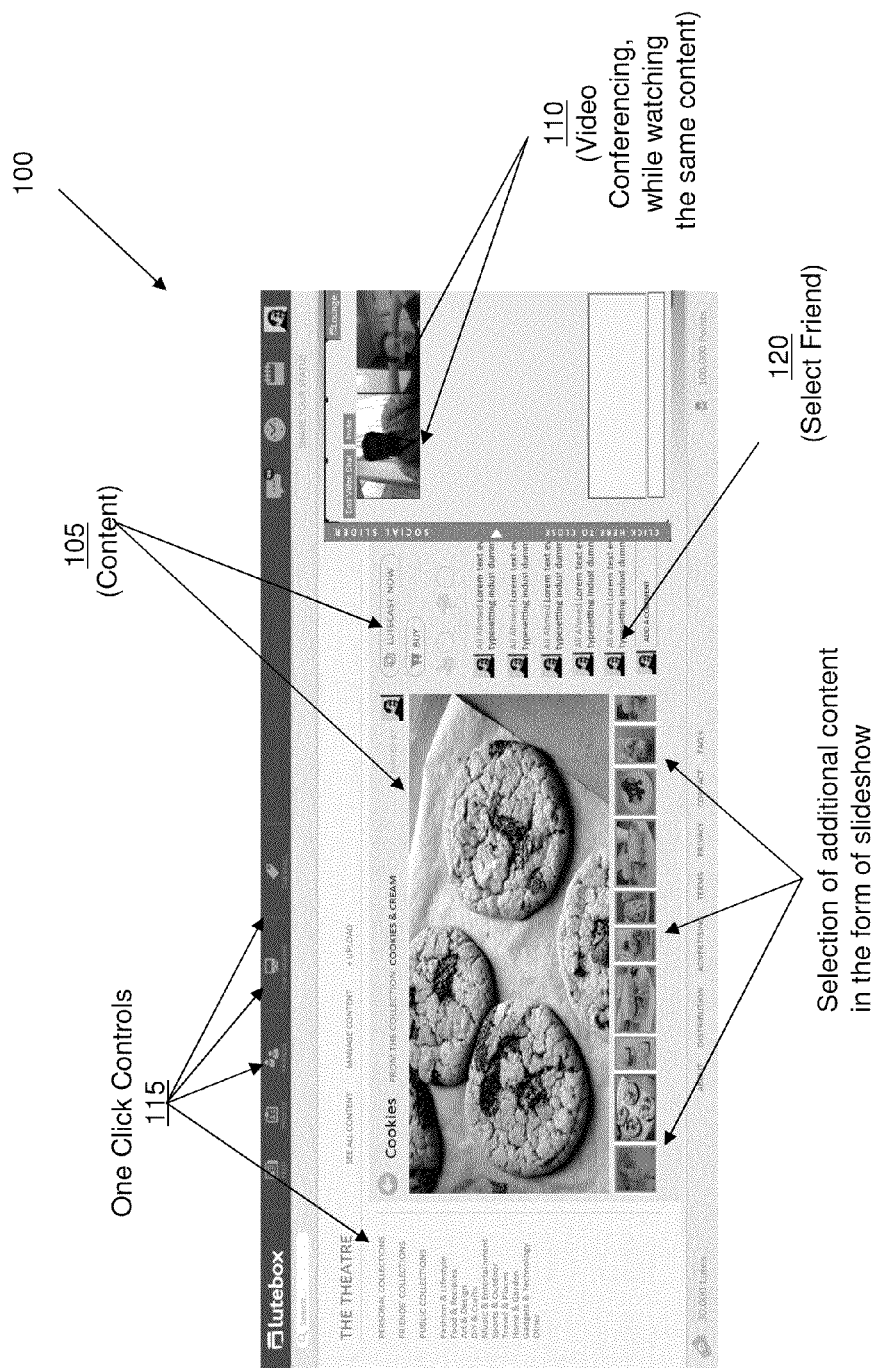
FIG. 2 is a representative screen view of a picture and video Sharing with video conferencing, in accordance with aspects of the present invention.

A profile area is provided where users can manage their favorite, saved and uploaded content, including albums (see, FIG. 2). This profile area can be provided on the interactive interface shown in FIG. 2, and saved on one or more servers 12 and storage areas 22B, which is accessed over the Internet by one or more of the computer devices 60. The present invention can store user data on servers and allows users to access their data (login access, saved content, and services) via any device or computer devices 60 with an internet connection. In embodiments, the collection area is a part of the user's profile and/or shopping page where he or she can save content they like to be able to quickly access it later and share with friends at any time.

In embodiments, the collection area is secure. For example, the present invention has layers of security to ensure protection of user data. Accordingly, each user has access only to their own collection area. If a user decides to make an album public, for example, then anyone can view that content, however, collections are specific to a user and will be accessible by them only where the data is their own. The user, though, can choose to share their collection in terms of just information or along with the actual content. Collections can also be made over content by other users, however, the owner of the content can choose to remove the content which would ideally move the content out of the user's collection. The option to retain the content will remain open. They can however, share the content within a collection with friends during a session. In embodiments, the host gets to decide which album is being displayed to his or her guests. They cannot manipulate the pictures as in edit the content in real-time, however, the participants can comment at run time on the picture being displayed.

The mechanism for sharing pictures and shopping and other features of the present invention can be implemented through AJAX commands and can be performed through session controls which are provided to one user and given a view of to another user. Thus, in embodiments, the present invention also provides a calling mechanism which without any additional downloads allows users to connect and create the session. For example, each piece of content on the site (picture and/or video) can have a session created and viewed at the same time. Between pictures and video, a fresh session is required to be created; however, this is not required for switching from one album to another or from text to photo. The content controller remains the same while the element linking remains the same. For example, each item is issued an ID and the ID is called hence only refreshing the item in the holder.

In embodiments, the controls can be used for controlling the shopping venues, product selection, video, movies or other interactive social events. This is, in embodiments, based on an interface which is utilized using basic controls akin to a remote control in one user's hand. In embodiments, the controllers will lie with the user that initializes the conversation/shopping/picture sharing (e.g., host) or other interactive social activity, movie watching, etc., which may be based on host ID and random generation.

Revenue can be generated by implementing the present invention. For example, merchants will generate revenues for click through purchases. Going forward, the present invention will sell products directly on the service, upon which a commission can be generated. Additionally, the present invention contemplates an advertising model where advertisers can place their ads in a highly socially charged and engaged setting, right before purchase. Other details which can be implemented with the server 12 and/or a computing device 14 are provided below.

Implementations

FIG. 2 is a representative screen view of a picture and video sharing with video conferencing, in accordance with aspects of the present invention. This representative screen view 100 can be provided, in real time, on each of the computing devices 60 shown in FIG. 1, and as implemented on the server 12 and/or a computing device 14 of FIG. 1. The representative screen view can also be representative of an online shopping experience.

As shown in FIG. 2, the user may perform all of the following at the same time with friends or family: play movies and music, shop for favorite items, broadcast live events and socialize and video chat, amongst other social activities all in real time and together. This makes the present invention feel and look like a virtual cinema; an online social mall, etc., while allowing real time communications. For example, as shown in FIG. 2 it is possible to show pictures and video sharing 105 with video conferencing 110, at the same time.

Being able to virtually watch a movie or video together with friends online while video chatting is a unique prospect and similar to a real-life experience at a cinema. Similarly, people often go to malls with friends to socialize, hangout, do window shopping and buy products, which can now be done in the virtual world using the present invention. The present invention, for example, is an online social mall, where people can browse millions of products from top merchants and retailers while video chatting with friends, getting instant feedback and having live discussions before making a purchase decision.

In embodiments, the present invention allows users to have a social profile and feed to update and interact with other members, include the collections area where they can manage their favorite, saved and uploaded content, as well as the ability to instantly "View", "Watch," "Play", "Show," and "Shop", e.g., through a one click navigation. These categories engage a mixture of user generated and premium content such as personal photos, product pictures, movies, music videos, and games, allowing users to simultaneously interact with one another in real-time through video chats and simulcasts, amongst other communication links. The premium content can be premium products from merchants on the platform, but can also refer to video content from major publishers such as films or music videos.

Users can also purchase credits, e.g., also known as "Lutes", which can be allocated towards premium content, including purchases of merchandize, multimedia (movies, video, etc.). This also allows users to pull together to pay for a movie or purchase an item, just like they might at the rental store or theatre or retail outlet in the real world. In embodiments, cost of the purchase of a product, service, multimedia, etc. would be deducted from an account, and each user in that group must accept the split before the transaction can be completed. The present invention, e.g., present technology, can also work within the product ecosystem.

Also, advantageously, users no longer have to tab around, or search and add "apps" as they would on other social networks; instead, they simply click one button next to any piece of content and can invite their friends instantly to watch it with them, or provide other social interactivity. Thus, within one click controls 115, using the interface shown, for example, in FIG. 2, a user can now access any photo or video or other social activity, e.g., shopping, with just one click using the architecture of the present invention. (Experience shows that online users prefer form over customization, and that the sheer number of apps can confuse users and additionally, due to certain social networking models, each app may need to be approved, which creates significant barriers. To the contrary, the present invention minimizes friction for users and offers them the best experience possible.)

By way of examples, the controls 115 can allow, for example, the user to connect to friends, theaters (video), shopping (mall), profiles, and feeds, amongst other possible controls. These controls allow a one click mechanism, on a single interface, so that the user can navigate from one interface to another. In embodiments, as an example, the navigation may allow the user to enter a virtual store of a participating merchant such as a retail store, cinema, etc. On each of the interfaces, pertinent information can be navigated and shared amongst friends, while video chatting and/or video streaming, in real time. In embodiments, video conference is as easy as selecting a friend, 120.

For the videos, in an illustrative, non-limiting example, controls 115 are based on the interface which is utilized using the basic controls like a remote control in one person hand. The controls 115 are given to the host of the session while the rest of the users controls are disabled and hidden. The way the video is playing for all the users is manipulated for all the participants. If the host changes the position of the video or changes the volume or presses pause, it will affect all users the same way.

The video chat client can also reduce bandwidth usage where there is a shortage of bandwidth availability and results in faster services. For example, the system and method of the present invention detects silence or no active video conferencing and can take the system into a non broadcasting mode. Detection is via volume level.

In embodiments, there can be multiple instances called for videos which have different parameters which are fed in them. This is so as to create the group based experience. If there is no change in values based on pre-calculated mechanisms the streaming of video can continue. That is that video is not seeked or change is not made in the timeline of the video. The pre-calculated mechanism is one where local times are matched, against which a time frame movement is defined for the system. This resulting in the time sync against the time line hence moving the processing to a local machine rather than at the server end.

Thus, the present invention allows the user to create a profile page, upload pictures and videos, invite and add friends, see their profile pages, etc., as discussed with regard to FIG. 1. Also, as representatively shown in FIG. 2, in addition, the present invention allows users to communicate in real-time with groups around content (pictures and videos). The present invention also allows users to view the same pictures and/or videos with a group of other users while video chatting with them. Thus, advantageously, the social network of the present invention offers users the ability to view pictures and photos simultaneously with friends while video chatting, and allows them to shop for products together.

The present invention can make the purchase options available to all users in the shopping mode. For example, a purchase button is included on every piece of content available to buy or from a premium merchant, so anyone viewing that content at that time can click "buy now". The purchase can be a bulk discount purchase. This can be negotiated by the use or the service providers of the present invention.

It should also be understood by those of skill in the art that any of the computer devices can be a tablet, smart phone or other mobile device, in which the present invention can be implemented as a mobile application. In this way, it is possible to provide mobile co-shopping, i.e. viewing the same product (either a saved picture, or live feed from your phone's camera) at the same time while video chatting with friends.

For example, a host user can take a picture of an item and share it with friends, while implementing the processes of the present invention. More specifically, in embodiments, the host or initiating user can take a picture of a product, which is of interest to purchase. This picture can then be sent to the other users, during a session. The picture can then be the topic of the video chatting, using the interface of FIG. 2, for example. In embodiments, product information can be superimposed on the picture, including price information, designer and/or retailer information, amongst other information. Alternatively, the product information can be texted amongst the users, using the interface of FIG. 2.

Figure 3:
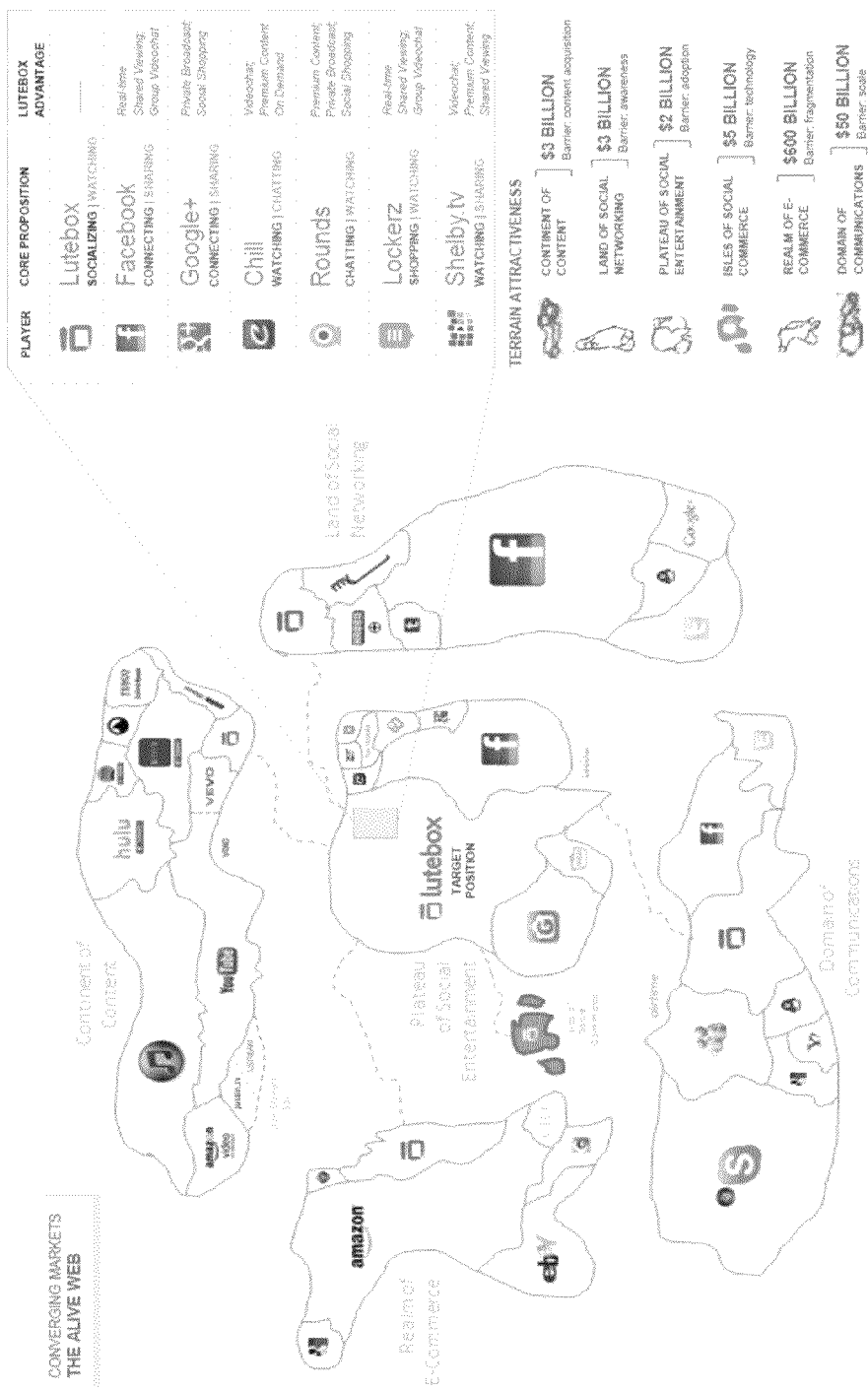
FIG. 3 shows a schematic representation of the benefits of the present invention.

FIG. 3 shows a schematic representation of the benefits of the present invention. More specifically, FIG. 3 shows the many advantages over conventional social networks. In embodiments, for example, the present invention is able to provide features which are not possible with any single or combination of social networks, including, for example, the use of video chatting while sharing content with other users. This can include, for example, in a single session, sharing shopping experiences with others while at the same time video chatting, without any disruptions. That is, as to the latter feature, the present invention allows a host user to navigate through web pages, share photos, watch videos, or movies, without any disruptions to the video chatting.

Figure 4:
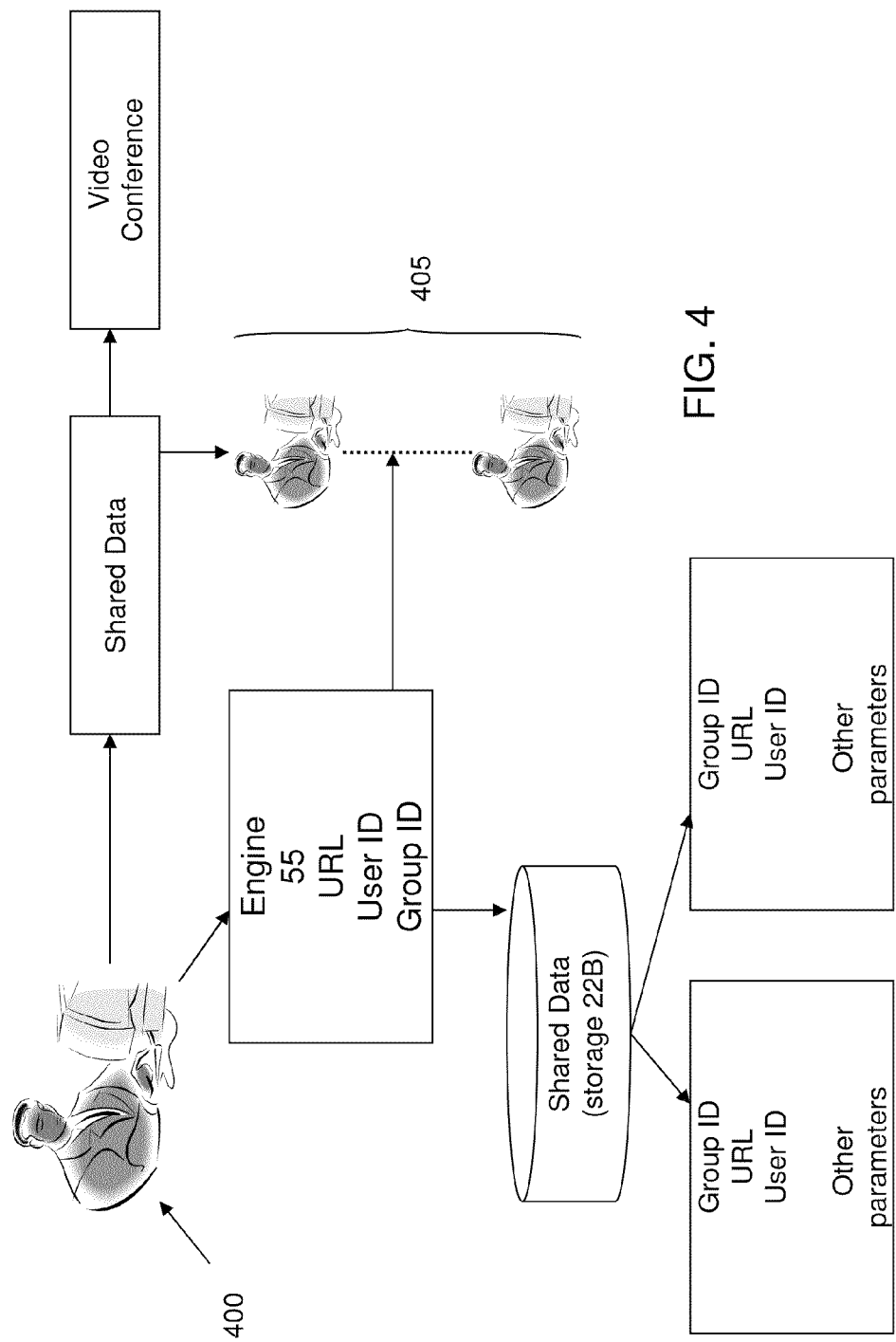
FIGS. 4 and 5 show various overviews of architectures in accordance with aspects of the invention.

FIG. 4 shows an architecture of the present invention, with an initiating user 400 and several shared users 405. As shown in FIG. 4, the initiating user 400 and the several shared users 405 can share data while also video conferencing (also referred to as video chatting). Also, by implementing this architecture, it is possible, for example, to provide real-time photo sharing, real-time social shopping and group video chatting while sharing content, while simultaneously video chatting without disruption (e.g., changing between activities such as between merchants, selecting different products, etc., will not disrupt the video chatting). Accordingly, the users 400, 405 can view the same content (e.g., photos, videos, merchandize) at exactly the same time, with the exact same quality, together.

In embodiments, the initiating user 400 calls to the engine 55 (or computing device 14 or server 12 of FIG. 1) to initiate a session. This session may include, for example, directing the initiating user 400 to a certain URL. This certain URL can be a home page of a merchant, e.g., online retailer, such as shown in FIG. 2. IN order to access the content within the online retailer, the user (host of the session) can navigate or access the content with one click navigation, as shown in the host URL, e.g., the interface shown in FIG. 2. In this way, the navigation between pages is made easy, and seamless, and will also not disrupt video chatting.

Prior to sharing data with others, the engine 55 will create a unique user ID and group ID for this session, which will be shared with the shared users 405. That is, in implementations, the engine 55 can create the user ID (e.g., User1ID123), after which the initiating user 400 sends an invite to the shared users 405 (using User1ID123 to initiate the session). The shared resource files given the ID are called during the course of the stream/sharing experience, i.e., session. As discussed above, the ID of the session is host related and is randomly generated so individuals cannot just join for security purposes. Instead, the initiating user must invite the users to attend, using the session User ID.

On connection, the other users 405 can access the same content as the user 400; however, the initiating user 400 with the unique user ID will remain in control of the content and/or other shared information, i.e., control the session. To establish another session, or show other session files, e.g., navigate between video and photos and shopping, the systems and processes of the present invention will provide another unique user ID and group ID for such session. The user ID will be particular to the host; whereas, the group ID will be particular to the invited participants.

In embodiments, the engine 55 can obtain shared data from a database (e.g., storage system 22B) or other shared data over a networking environment. The shared data can be shared or obtained from other URLs, with specific group and user IDs, in addition to other parameters, such as security. In embodiments, shared data can access other collection areas that remain secure, via other user IDs, group IDs or other parameters. For example, using layers of security, each user has access only to their own collection area, but these collections can be shared.

Figure 5:
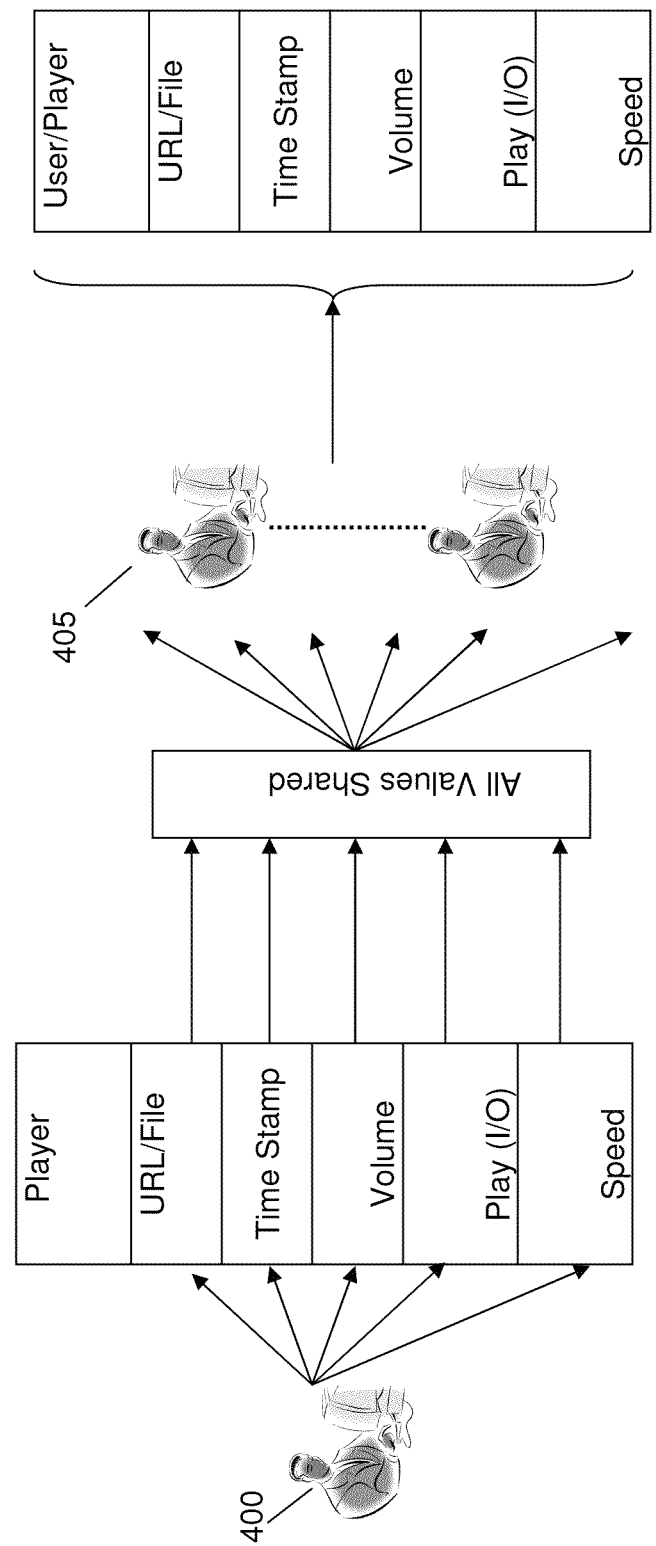

FIG. 5 shows an additional view of the architecture of the present invention. As shown in FIG. 5, the initiating user 400 can initiate a session. By establishing the connection, the initiating user 400 can write to many of the different functions/modules, e.g., URL file, time stamp, volume, play (110) and speed, in order to share values with the shared users 405. In this way, the initiating user 400 can initiate and control the session, including providing the above features. These above features can then be shared with the shared users 405. More specifically, as discussed above, time stamp is the recorded time instance, volume is the audio level control, play (I/O) is the control to start the content/video, and speed is the seek/forward/etc. function for videos. Player is the flash player that is used to display photo and video content. URL/File is the location of the content.

In embodiments, multiple session files can be called at different instances for a value of change. In this way, a single file is shared between multiple users, however, when another session is started based on the fields in the database all the values are manipulated for those users which will share the data. When the sessions are created, a certain part of the code is retained in a shared space, accessing locations and timers so that each invited user can connect into the same file with the assigned user ID. This process calls a resource file which is writeable by the host 400 and viewable by the user 405. In this way, all the changes on the file are automatically updated for the remaining users.

Flow Diagram

Flow diagrams may equally represent a high-level block diagram or a swim-lane diagram of the invention. The steps of the flow diagrams may be implemented and executed from either a server, in a client server relationship, or they may run on a user workstation with operative information conveyed to the user workstation. Furthermore, the invention can take the form of a computer program product accessible from a computer-usable or computer-readable medium providing program code for use by or in connection with a computer or any instruction execution system. The software and/or computer program product can be implemented in the environment of FIG. 1. The present invention may be embodied as a system, method or computer program product. The present invention may take the form of a hardware embodiment, a software embodiment or an combination of software and hardware. Furthermore, the present invention may take the form of a computer program product embodied in any tangible storage readable medium of expression having computer-usable program code embodied in the medium.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

FIG. 6 shows a flow diagram implementing aspects of the present invention. At step 600, the user initiates a session. At step 605, the systems and processes of the present invention establish a session by creating a user ID and a group ID. At step 610, the user can share the session with one or more additional users by use of the user ID and a group ID. By using the user ID and group ID, the systems and processes of the present invention can create session files in order for the initiating user to share videos, picture, or other content, e.g., merchandise from an online, virtual store, amongst the multiple users. At step 615, once the invitee accepts, their webcam will activate thus allowing the users to videochat (while also viewing any the content together). In implementations, all the users sharing a piece of content will be served the exact same quality picture (or other content) at the same time, on a different computing device.

At step 620, the initiating user can control the session by navigating and linking to participating sites. For example, the initiating user can link to a merchant's virtual store where users can browse for products, navigate through the many different pages, while socializing with the other users. For example, for shopping, the initiating user can select a browsing and/or purchase option so that all users will have access to the same content, and can discuss this content in real-time, through video streaming. In this example, the merchant can provide bulk discounts on the basis of mutual purchases upon two or more of the users sharing the content. As another example, the initiating user can control the session by navigating to a different merchant, a theater (to watch a movie) or other social networking site, while at the same time not disrupting the video chat or other communication. This is achieved by having the activities provided separately from the video or texting communication. Alternatively, at step 625, the initiating user can select to share photos, videos, etc. In embodiments, the photos, videos, etc. can be stored remotely in the cloud infrastructure.

ALTERNATIVE EMBODIMENTS

Figure 7B:
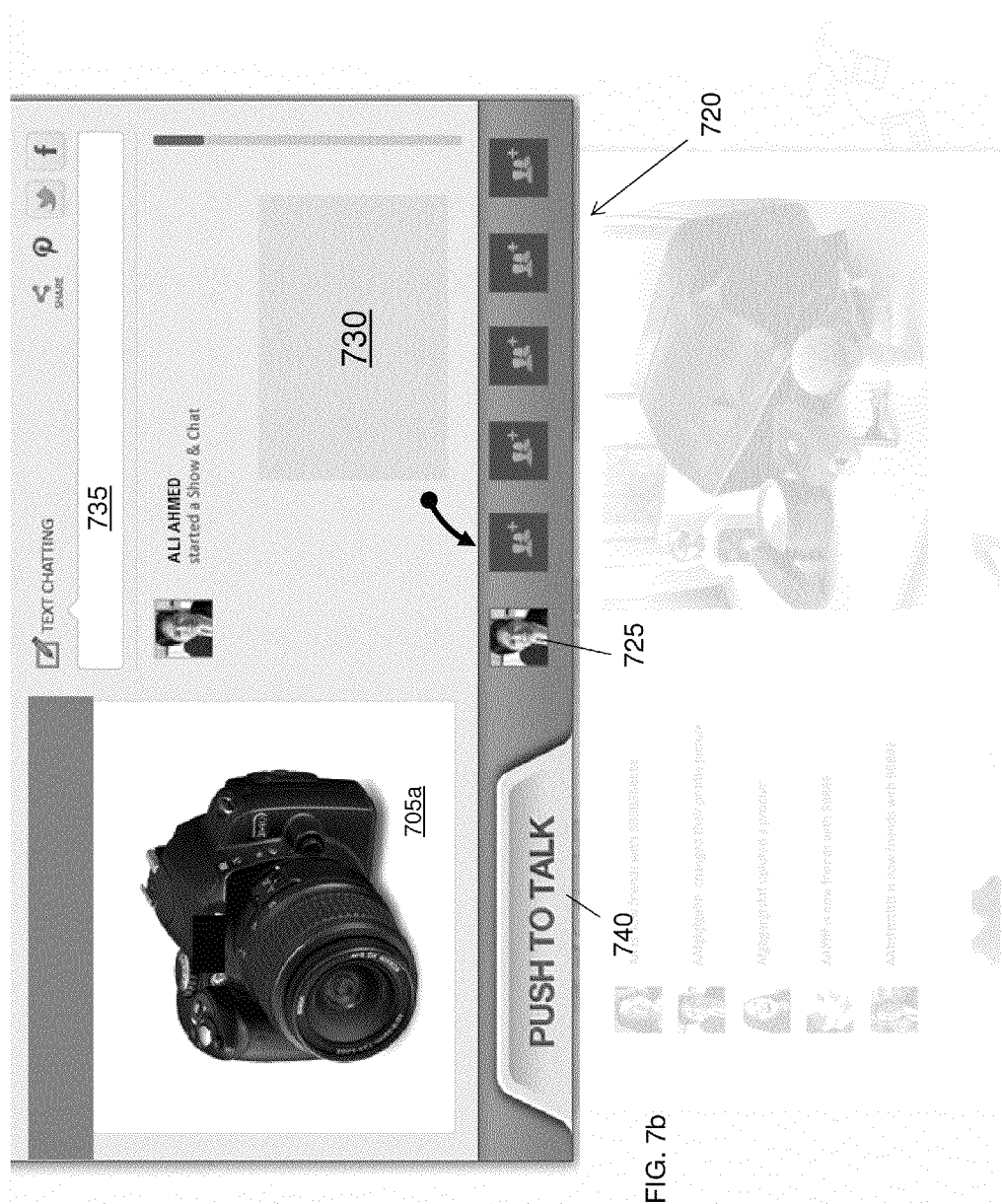
Figure 7C:

FIGS. 7a-7c show another implementation in accordance with aspects of the present invention. In particular, as shown in FIG. 7a, the present invention can be implemented directly from a third party website 700. In embodiments, the third party can be a retailer, a publisher, or any service provider as contemplated by the present invention. As shown in FIG. 7a, a plurality of images 705a, 705b, . . . 705n can be provided on the third party website 700, in addition to a plurality of links 710 to other websites. In embodiments, a show and chat link 715 can be provided on each of the plurality of images 705a, 705b, . . . 705n, as the cursor, for example, hovers over any of the plurality of images 705a, 705b, . . . 705n. As should be understood by those of skill in the art, the show and chat link 715 can also be provided over any text, etc. This can be accomplished by coding such information directly into the third party website 700, much like any link is provided, e.g., "buy now" link, as should be understood by those of skill in the art such that no further explanation is required herein. The show and chat link 715 can be provided by a downloading a plugin (see, e.g., FIG. 7a, reference numeral 750) or utilizing a browse feature from within the interface provided by the infrastructure shown in FIG. 1, for example.

As shown in FIG. 7b, by selecting the show and chat link 715, the system and method of the present invention can direct the user to a chat window 720 in accordance with aspects of the present invention. The chat window 720 can be part of the third party website 700 or, alternatively, can be a standalone website in accordance with aspects of the present invention. In the latter scenario, the user can be forwarded to the interface much like that shown in FIG. 2 using the features of the present invention as already described herein. The standalone website can be presented by use of a URL connection, when selection of the show and chat link 715 is made.

As shown in FIG. 7b, the chat window 720 includes several features such as, for example, the selected image 705a, a plurality of icons 725 to add friends, in which once a friend is selected, their image and other information can appear in space 730, as well as a text chatting field 735 and a push to talk feature 740. The selected image 705a can be provided on the standalone website by a simple parsing feature of the third party website 700. For example, the system and methods of the present invention can parse the HTML file and retrieves all image format locations. The image information is then tagged and shown on an webpage, e.g., standalone website in accordance with aspects of the present invention.

FIG. 7c shows the addition of a friend 745 and selection of the push to talk feature 740. The addition of a friend can be provided by selection of any of the plurality of icons 725. By selecting the push to talk feature 740, a communicate link is provided with the selected friend(s), e.g., 745, while viewing the same image 705a in accordance with the present invention. As already discussed herein, the viewing of the same image 705a and the conversation with the friend 745 can be done simultaneously, in accordance with aspects of the present invention. That is, the viewing of the same image 705a and the conversation with the friend 745 can be performed in real time, on different channels. In embodiments, if the friend is not available, it is also possible to leave a voicemail message.

Figure 8A:
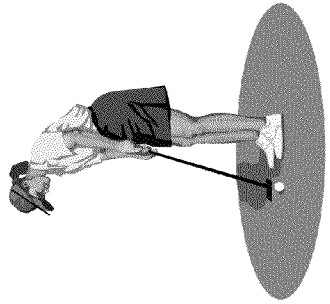
FIGS. 8a-8c show another implementation using a third party website in accordance with aspects of the present invention.
Figure 8B:
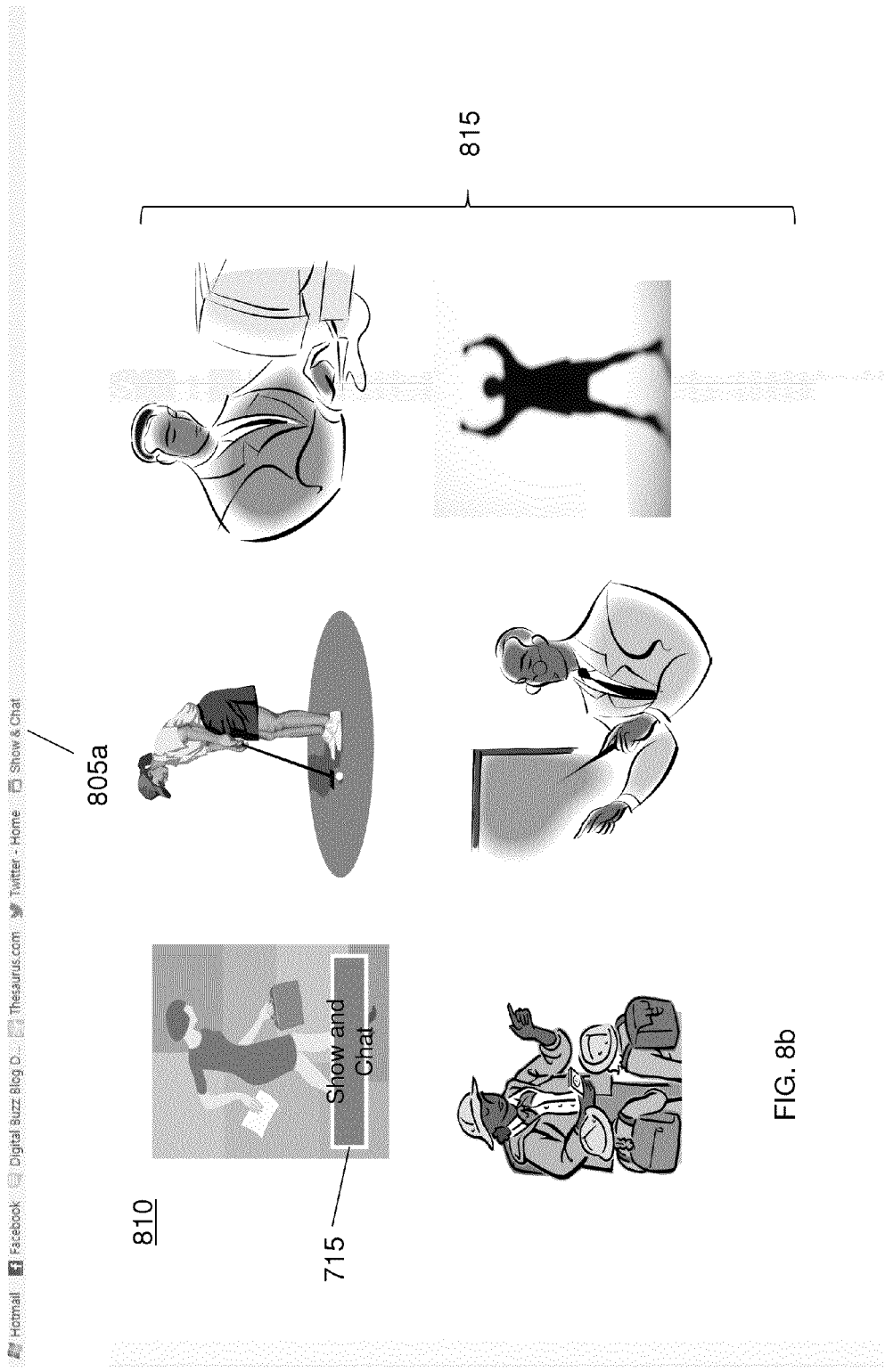
Figure 8C:
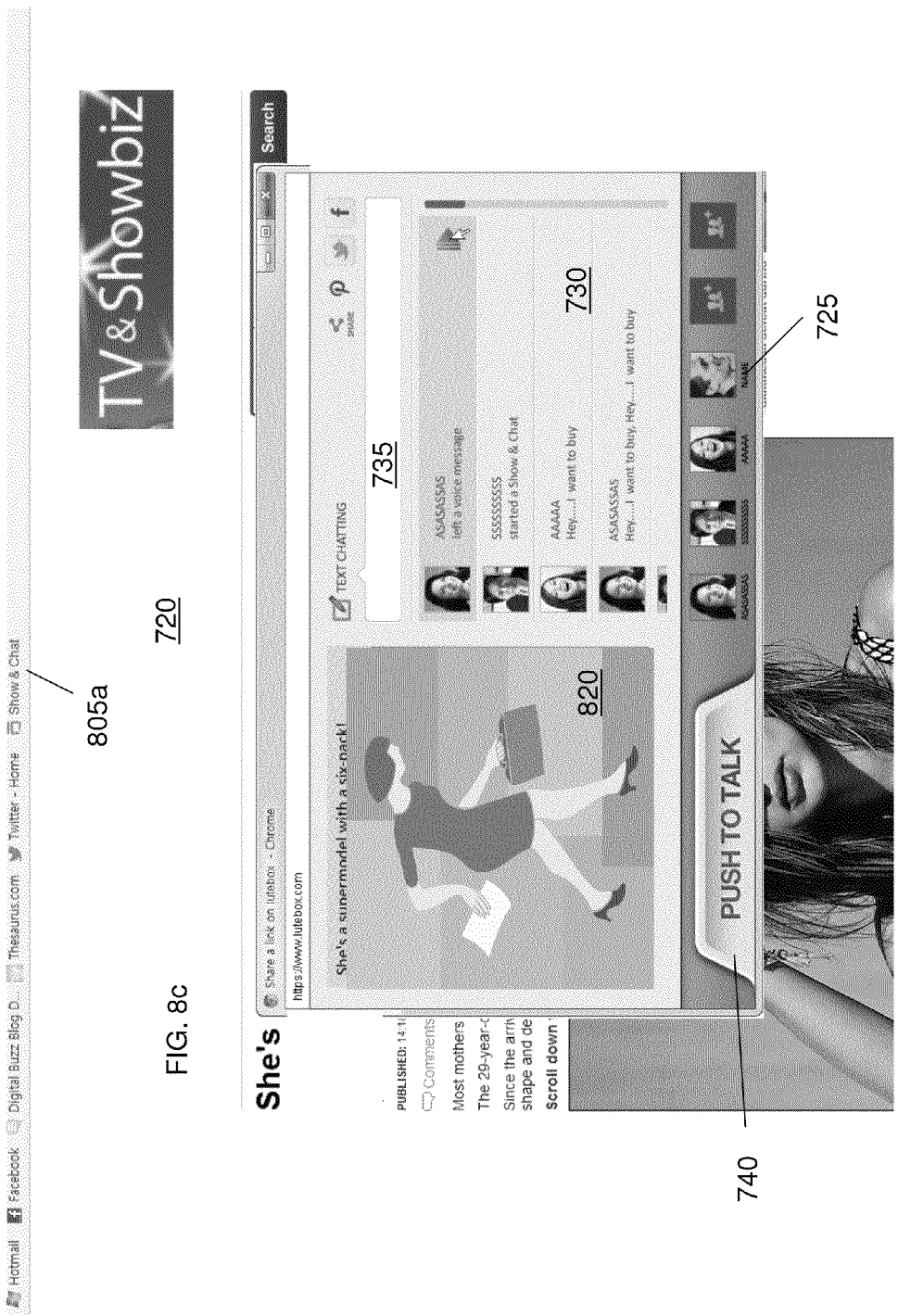

FIGS. 8a-8c show another implementation in accordance with aspects of the present invention. In particular, as shown in FIG. 8a, the present invention can be implemented directly from a third party website 800. In embodiments, the third party can be also be retailer, a publisher, or any service provider as contemplated by the present invention. As shown in FIG. 8a, the third party website 800 is a publisher, which includes an article with associated images of a person. A show and chat bookmark 805a is provided on the menu bar or status bar 802 of the browser. The browser can be any known browser provided by a third party, as should be known by those of skill in the art. In additional or alternative embodiments, a show and chat link 805b can also be embedded directly in the third party website 800, much like any shared button, e.g., "Tweet", "Share", etc.

In either scenario, the user can select the show and chat bookmark 805a or the show and chat link 805b, which will direct the user to another webpage as shown in FIG. 8b. As should be understood by those of skill in the art, the show and chat 805a bookmark and/or the show and chat link 805b can be integrated with the third party website by embedding the appropriate code into their website. Alternatively, the show and chat bookmark 805a and/or the show and chat link 805b can be provided by downloading a plugin (see, e.g., FIG. 7a, reference numeral 750) or utilizing a browse feature from within the interface provided by the infrastructure shown in FIG. 1, for example.

In FIG. 8b, by selecting the show and chat bookmark 805a or the show and chat link 805b, the system and method of the present invention can direct the user to the webpage 810. The webpage 810 can include a plurality of images 815. As already discussed herein, the system and methods of the present invention can parse the HTML file and retrieve all image format locations. The information is then tagged and shown on the webpage 810 (i.e., by allowing the system to retrieve the images). As discussed with reference to FIG. 7a, the user can then hover the cursor over any of the images in order to active the "show and chat" link 715.

As shown in FIG. 8c, the chat window 720 will then be presented to the user. As already discussed herein, the chat window 720 includes several features such as, for example, the selected image 820, a plurality of icons 725 to add friends, in which once a friend is selected, their image and other information can appear in space 730, as well as a text chatting field 735 and a push to talk feature 740.

Figure 9:
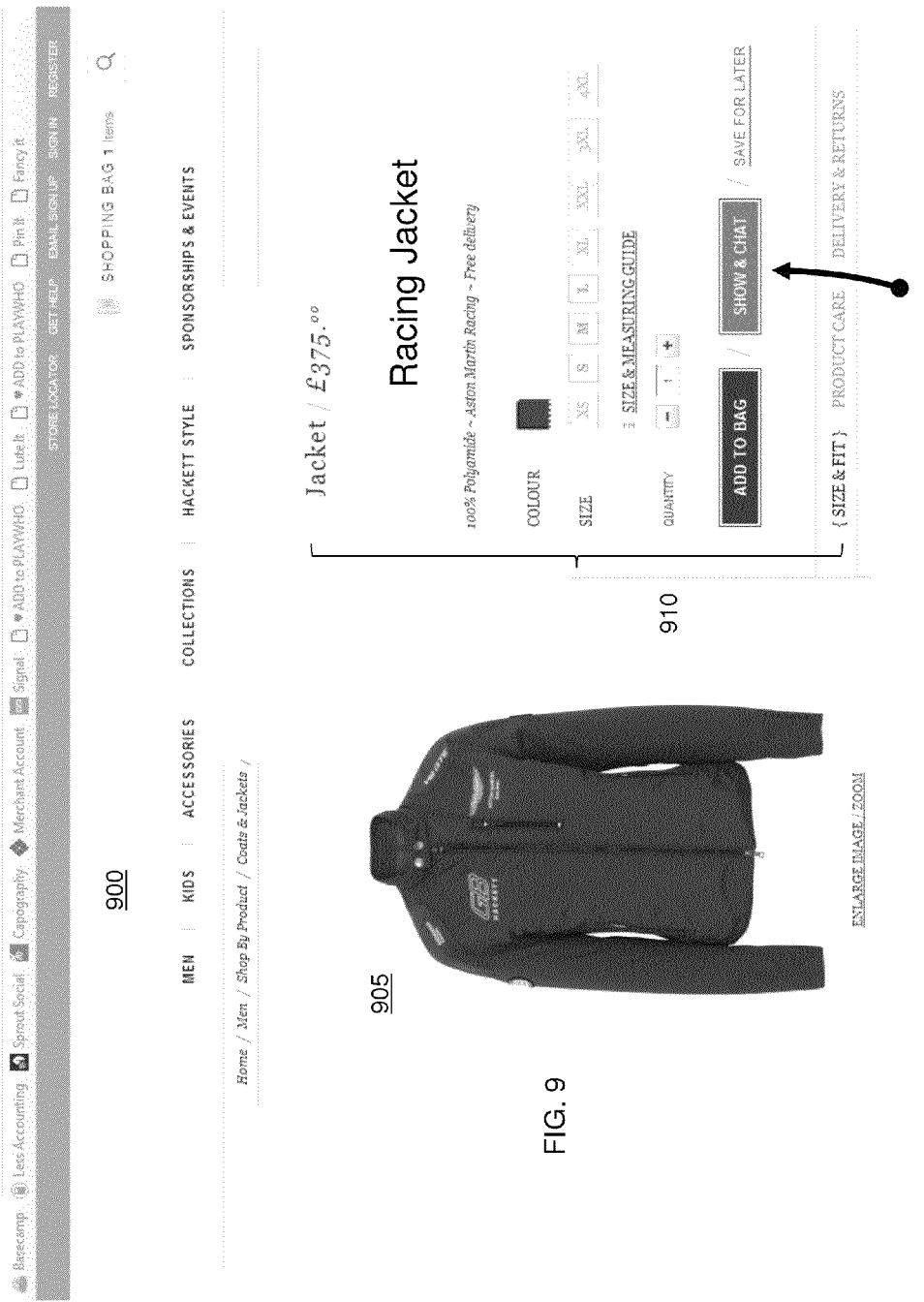
FIG. 9 shows yet another implementation using a third party website in accordance with aspects of the present invention.

FIG. 9 shows another implementation in accordance with aspects of the present invention. In particular, as shown in FIG. 9, the present invention can be implemented directly from a third party website 900. In embodiments, the third party can be a retailer, a publisher, or any service provider as contemplated by the present invention. As shown in FIG. 9, one or more images 905 can be provided on the third party website 900, in addition to a description and purchase information 910. In embodiments, a show and chat link 915 can be provided with the description and purchase information 905. By selecting the show and chat link 915, the system and method of the present invention can direct the user to a chat window as shown in, for example, FIG. 7b or 8c in accordance with aspects of the present invention. The chat window can be part of the third party website or, alternatively, can be a standalone website in accordance with aspects of the present invention, as discussed herein.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method implemented in a computing infrastructure, comprising:
   initiating a user session by generating a unique user ID and group ID for the user session;
   streaming at least one of music and video to a plurality of users on separate computing devices within the user session; and
   providing video chatting amongst the plurality of users on the separate computing devices, within the session, at the same time as the streaming.

2. The method of claim 1, wherein the video chatting is on a different channel than the streaming.

3. The method of claim 2, wherein an initiating user navigates amongst different streaming data without disrupting the video chatting, which is occurring simultaneously as the streaming of the data.

4. The method of claim 1, wherein:
   the streaming is of a same quality amongst the separate computing devices;
   the streaming and the video chatting occur in real time;
   the streaming can be changed without disrupting the video chatting; and
   the streaming originates from a same computing storage device.

5. The method of claim 4, wherein an initiating user is an only user with permission to navigate amongst different streaming content and invite any of the plurality of users into the user session.

6. A system implemented in hardware comprising a processor executing an engine that is operable to perform the steps of claim 1.

7. A system comprising at least one processing engine operable to:
   initiate a user session by generating a unique user ID and group ID for the user session; and
   stream video and/or music within the user session to a plurality of users while simultaneously providing video chatting amongst the plurality of users having access to the user session, wherein:
   the video chatting is provided on a different channel than the streaming video or music;
   the streaming video and/or music can be changed by a single user without disrupting the video chatting; and
   the streaming video and/or music is stored in a central storage system on a computing network such that a same quality of the streaming video and/or music is streamed at the same time to all of the plurality of users invited to the user session.

8. The system of claim 7, wherein:
   the user session is initiated by the single user and comprises generating a user ID and a group ID that is for only the single user and invited users of the single user; and
   the session is controlled only by the single user.

9. The system of claim 7, further comprising providing a one click navigation from a single interface such that the single user can navigate amongst different content, which is shared amongst the amongst the plurality of users having access to the user session, while simultaneously video chatting, in real time.

10. The system of claim 7, wherein the single user controls the streaming by movement between different videos and/or music.

11. The system of claim 10, wherein the single user activates the video chatting by inviting one or more additional users to the session which, upon acceptance, automatically activates a webcam on the computing device of the one or more additional users.

12. The system of claim 10, wherein the streaming video or music is provided on a central repository and is provided to selected ones of the plurality of users having access to the user session.

13. A computer program product comprising a computer usable storage medium having readable program code embodied in the storage medium, the computer program product includes at least one component operable to:
   initiate a user session;
   access streaming video or music via a single interactive interface within the user session;
   share the streamed stream video or music on separate computing devices of a plurality of users within the user session; and
   communicate amongst a plurality of users by video chatting in the user session as the streaming, wherein:

the communicating is provided in a same session but on a different channel than the streaming such that a change in content will not disrupt the video chatting.

14. The computer program product of claim 13, wherein:
the communicating occurs in real time; and
a quality of the streamed stream video or music is provided at a same quality and at a same time to the separate computing devices during the user session.

15. The computer program product of claim 14, wherein the streamed video or music is provided on a central repository accessible by any of a plurality of separate computing devices.

16. The computer program product of claim 15, wherein a first user provides authorization for the central repository to provide the streamed stream video or music to selected users within the user session.

17. A computer system for interactive social networking, the system comprising:
a CPU, a computer readable memory and a computer readable storage media;
first program instructions to initiate a user session by generating a unique user ID and group ID;
second program instructions to stream video or music, in real time and within the user session, to any of a plurality of separate computing devices by assigning the unique ID and group ID of the user session to the separate computing devices as requested by an initiating user of the user session; and
third program instructions to provide video chatting in real time within the user session, and on a different channel than the streaming,
wherein the first, second, and third program instructions are stored on the computer readable storage media for execution by the CPU via the computer readable memory.

18. The computer system for interactive social networking of claim 17, wherein the streaming video or music is changeable only by the initiating user, and without disrupting the video chatting.

19. The computer system for interactive social networking of claim 17, further comprising fourth program instructions to store on a storage system in a computing network the streaming video or music.

20. The computer system for interactive social networking of claim 17, wherein the streaming video or music is accessible within the user session by any of the plurality of users within the session, at a same quality.

* * * * *